United States Patent

Ogata et al.

[11] 4,352,897
[45] Oct. 5, 1982

[54] RESIN MOLDED STATORS

[75] Inventors: Masatsugu Ogata; Hirokazu Takasaki, both of Hitachi; Masanori Nemoto; Toshikazu Narahara, both of Ibaraki; Kenichi Hironaka; Tetuo Ishikawa, both of Hitachi, all of Japan

[73] Assignee: Hitachi, Ltd., Tokyo, Japan

[21] Appl. No.: 103,506

[22] Filed: Dec. 14, 1979

[30] Foreign Application Priority Data

Dec. 20, 1978 [JP] Japan .............................. 53-156348

[51] Int. Cl.³ .......................................... C08L 67/06
[52] U.S. Cl. ................................... 523/220; 523/509; 523/512; 523/513; 523/514; 523/515; 523/521; 523/527; 310/43
[58] Field of Search ...................... 260/40 R; 310/43

[56] References Cited

U.S. PATENT DOCUMENTS 3,923,927  12/1975  Miyake et al. .................... 260/40 R
4,128,527  12/1978  Kinjo et al. ........................... 310/43

Primary Examiner—Lewis T. Jacobs
Attorney, Agent, or Firm—Antonelli, Terry & Wands

[57] ABSTRACT

A resin molded stator comprising a stator core and coils as major constituents at least parts of which are molded into one piece by a molding material, said molding material comprising (a) a low-shrink unsaturated polyester resin, (b) a filler having a particle size of 44 μ or less, and (c) a fibrous material having a length of 3 mm or less, in proportions of 15 to 40% by weight of the component (a) and 60 to 85% by weight of a total of the components (b) and (c), and a weight ratio of the component (b) to the component (c) being 3/1 to 30/1, is excellent in crack resistance, moisture resistance and insulating properties.

12 Claims, 3 Drawing Figures

RESIN MOLDED STATORS

BACKGROUND OF THE INVENTION

This invention relates to resin molded stators, more particularly to resin molded stators excellent in crack resistance at the molded portions and in insulating properties of coils immediately after the molding of the molded coils and under high temperatures and moisture.

Recently, in order to improve properties and reliability of electric machines, or in order to conduct miniaturization and weight saving of electric machines or rationalization of production processes thereof, there have widely been employed processes for molding a part or whole of these machines by using various molding materials (e.g. U.S. Pat. Nos. 3,758,799, 4,128,527, etc.). These processes have also been applied to motors and those having armature coils molded by compression or transfer molding using various molding materials such as thermosetting resins, e.g. epoxy resins, polyester resins, polyimide resins, silicone resins, phenol-formaldehyde resins, etc. in place of treatment with varnishes are available commercially.

But motors wherein coil end portions of stators for motors, slot portions and terminal portions are molded into one piece by the processes as mentioned above are hardly available commercially. This is because there remain many problems to be solved such as in crack resistance of molded articles, insulating properties of molded coils, reliability of motors under high temperatures and high moisture, and the like.

SUMMARY OF THE INVENTION

It is an object of this invention to provide resin molded stators improved in crack resistance of molded articles and in insulating properties of coils immediately after the molding and under high temperatures and high humidity and having high reliability.

This invention provides a resin molded stator comprising a stator core and coils as major constituents at least parts of which are molded into one piece by a molding material, said molding material comprising (a) a low-shrink unsaturated polyester resin, (b) a filler having a particle size of $44\mu$ or less, and (c) a fibrous material having a length of 3 mm or less, in proportions of 15 to 40% by weight of the component (a) and 60 to 85% by weight of a total of the components (b) and (c), and a weight ratio of the component (b) to the component (c) being 3 to 30/1.

BRIEF DESCRIPTION OF DRAWINGS

FIG. 2 (b) is a longitudinal sectional view of the resin molded stator of FIG. 2 (a).

FIG. 3 (b) is a longitudinal sectional view of the resin molded stator of FIG. 3 (a).

DETAILED DESCRIPTION OF THE INVENTION

Figure 1:
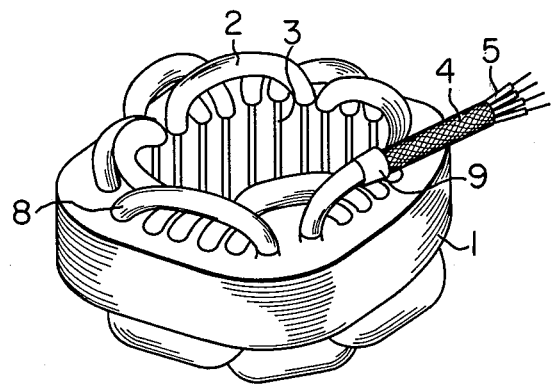
FIG. 1 is a schematic perspective view of a stator used for a resin molded stator.

As the resin component (a) of the molding material used in this invention, it is preferable to use a low-shrink unsaturated polyester resin comprising (i) a terephthalic acid series unsaturated polyester, (ii) styrene and (iii) a saturated polyester (used as an agent for imparting low shrinkage). The low-shrink unsaturated polyester resin (hereinafter referred to as "the resin component") is excellent in curing properties comparing with other thermosetting resins and can be molded into molded articles in a short time without requiring postcure after molded. Further, by changing a mixing amount of the agent for imparting low shrinkage, shrinkage of the molding material can be changed freely and thus crack resistance of the molding material due to mold shrinkage of the resin can easily be improved.

In general, shrinkage of various unsaturated polyester resin can be reduced by mixing various thermoplastic resins as an agent for imparting low shrinkage, but there is a tendency to cause various problems such as lowering in heat resistance of cured articles, scattering of various properties of a molding material due to poor compatibility of the two, dirt of molds, stick in cavity, and the like. But since the terephthalic acid series unsaturated polyester is remarkably excellent in heat resistance of cured articles comparing with iso- or orthophthalic acid series unsaturated polyesters, heat resistance sufficient for practical use can be retained even if the heat resistance is slightly lowered by mixing a thermoplastic resin for imparting low shrinkage. Further since the terephthalic acid series unsaturated polyester has remarkably good compatibility with a saturated polyester, the resulting mixed molding material has features in that it is excellent in storage stability, there hardly take place dirt of molds at the time of molding and stick in cavity, scattering of properties of cured articles is little, and the like.

The terephthalic acid series unsaturated polyester (i) is an unsaturated polyester produced by polymerizing a saturated dicarboxylic acid component such as terephthalic acid, dimethyl terephthalate, etc., an unsaturated dicarboxylic acid component such as fumaric acid, maleic acid, maleic anhydride, chloromaleic acid, dichloromaleic acid, etc., and a glycol component such as ethylene glycol, propylene glycol, 1,4-butanediol, 1,3-butanediol, 2,3-butanediol, diethylene glycol, dipropylene glycol, triethylene glycol, 1,5-pentanediol, 1,6-hexanediol, neopentyl glycol, 2,2,4-trimethylpentanediol-1,3, hydrogenated bisphenol A, 2,2-di(4-hydroxypropoxyphenyl)propane, pentaerythritol diallyl ether, glycerin, trimethylene glycol, 2-ethyl-1,3-hexanediol, etc. These compounds can be used alone or a mixture of two or more of them.

The saturated polyester (iii) is a thermoplastic saturated polyester produced by using as an acid component one or more saturated dicarboxylic acids such as phthalic anhydride, isophthalic acid, terephthalic acid, tetrachlorophthalic anhydride, HET acid, tetrabromophthalic anhydride, endomethylenetetrahydrophthalic acid, tetrahydrophthalic anhydride, hexahydrophthalic anhydride, succinic acid, adipic acid, azelaic acid, sebacic acid, anthracene-maleic anhydride adduct, rosin-maleic anhydride adduct, etc., and as a glycol component one or more compounds such as ethylene glycol, propylene glycol, 1,4-butanediol, 1,3-butanediol, 2,3-butanediol, diethylene glycol, dipropylene glycol, triethylene glycol, 1,5-pentanediol, 1,6-hexanediol, neopentyl glycol, 2,2,4-trimethylpentanediol-1,3, hydrogenated bisphenol A, 2,2-di(4-hydroxypropoxyphenyl)propane, pentaerythritol diallyl ether, glycerin, trimethylene glycol, 2-ethyl-1,3-hexanediol, etc.

Proportions of individual components (i) to (iii) of the resin component (a) are preferably 90 to 70% by weight of a total of the terephthalic acid series unsaturated polyester (i) and styrene (ii) and 10 to 30% by weight of the saturated polyester (iii), and the weight ratio of the terephthalic acid series unsaturated polyester to styrene being preferably 80/20 to 40/60. By controlling the mixing ratio as mentioned above, the molding material having molding shrinkage of 0.5% or less after molding can be obtained and the resulting molded articles are good in various properties. If the proportion of the saturated polyester (iii) is less than 10% by weight, a sufficient effect in lowering molding shrinkage is not obtained, while if the proportion is more than 30% by weight, there arise various problems in practical use due to remarkable lowering in heat resistance of cured articles. Therefore, considering the balance of various properties, the range of 10 to 30% by weight of the saturated polyester (iii) is preferable. On the other hand, if the proportion of styrene in the total weight of the terephthalic acid series unsaturated polyester (i) and styrene (ii) is less than 20% by weight, the viscosity of the resin component (a) becomes too high and the viscosity of the molding material after mixing with the filler (b) and the fibrous material (c) in the prescribed amounts also becomes remarkably high, which results in remarkably lowering in filling properties of the molding material into slots or coils, or easily lowering in insulating properties of coils when molding motors. If the proportion of styrene in the total weight of the terephthalic acid series unsaturated polyester (i) and styrene (ii) is more than 60% by weight, the viscosity becomes too low, which results in easily generating cavity or voids in molded articles, or easily generating separation between the resin component and the filler or the fibrous material at the time of molding, and causing scattering in properties of cured articles and crack resistance of molded articles. Therefore, the weight ratio of the terephthalic acid series unsaturated polyester (i) to styrene (ii) is preferably in the range of 80/20 to 40/60.

The resin component (a) should be used in the range of 15 to 40% by weight in the molding material. If the amount is less than 15% by weight, the viscosity of the molding material becomes too high to give sufficient fluidity, while if the amount is more than 40% by weight, there arise various problems in that shrinkage and thermal expansion coefficient of the molding material become large, particularly crack resistance of the molding material is lowered, separation between the resin component and the filler easily takes place at the time of molding, filling properties are lowered or scattering of properties of cured articels takes place.

The filler (b) should have a particle size of 44μ or less. If the particle size is larger than 44μ, impregnation of the molding material is easily inhibited and poor impregnation easily takes place due to clogging of the filler at the time of impregnating the molding material between coils and/or into slots. Further, if impregnated, since the molding material is forced to impregnate into very narrow gaps between coils or very narrow entrances of slots depending on molding conditions, deformation of coils or damage of enamel coating easily take place, which results in easily taking place lowering in breakdown voltage of coils after molded.

Examples of the fillers having a particle size of 44μ or less are calcium carbonate (including dust-size particles of calcite, Iceland spar, aragonite, marble, chalk, etc. of natural occurrence), magnesium carbonate, barium sulfate, calcium sulfate, alumina, clay, kaoline, talc, diatomaceous earth, mica powder, glass fiber powder, aluminum hydroxide, magnesium hydroxide, hydrated gypsum, zinc borate, borax, silica sand, and the like. These fillers can be used alone or as a mixture of two or more of them.

Among the fillers mentioned above, it is preferable to use aluminum hydroxide in an amount of 20% by weight or more based on the total weight of the molding material. This is because aluminum hydroxide can prevent the molding material from combustion or explosion even if an excess current is passed through coils at a time of abnormal state such as locking of a motor. In order to attain such an object, the use of other water-containing inorganic fillers other than aluminum hydroxide may be effective, but as materials which are not pyrolyzed at a molding temperature (usually at 100°–170° C.) but pyrolyzed (decomposition with dehydration) at a lower temperature than the pyrolysis temperature of the resin, aluminum hydroxide is most suitable.

The amount of the filler (b) should be determined considering the amount of the fibrous material (c) mentioned below. The total weight of the filler (b) and the fibrous material (c) should be 60 to 84% by weight of the molding material and the weight ratio of the filler (b) to the fibrous material (c) should be 3 to 30/1. Therefore, the filler (b) may be included in the molding material in an amount of about 45 to 82% by weight and the fibrous material (c) may be included in the molding material in an amount of about 2 to 21% by weight so long as the ratio of (b)/(c) is in the range of 3/1–30/1. If the amount of the filler is lower than the range mentioned above, shrinkage and thermal expansion coefficient become large and crack resistance of molded articles is lowered, while if the amount is larger than the range mentioned above, the viscosity of the molding material remarkably increases, which results in easily bringing about deformation of coils and damage of enamel coating. In order to increase the amount of the filler (b) without increasing the viscosity of the molding material so much, it is known to use one or more fillers having different particle sizes (e.g. U.S. Pat. No. 3,658,750).

The fibrous material (c) is included in the molding material in order to improve crack resistance of molded articles and mechanical strength of cured articles of the molding material. The fibrous material should have a fiber length of 3 mm or less, preferably 0.5–3 mm, more preferably about 0.5–1.5 mm. If the fiber length is larger than 3 mm, poor impregnation easily takes place due to clogging of the molding material at the time of making the molding material flow into narrow gaps between coils or narrow entrances of slots, or deformation of coils or damage of enamel coating easily takes place due to enforced flow of the molding material, which results in lowering in insulating properties of molded coils, as in the case of using the filler having a larger particle size than 44μ. On the other hand, if the fiber length is too short, sufficient reinforcing effect cannot be ontained.

Examples of the fibrous materials are various fibers of glass, carbon, polyvinyl alcohol (vinylon), nylon, cellulose and the like. These fibrous materials can be used alone or as a mixture of two or more of them. Among them, glass fiber is most preferable taking properties of the molding material and cured articles and economy into consideration. The amount of the fibrous material is about 2 to 21% by weight of the molding material so long as the weight of the filler to the fibrous material is 3 to 30/1 as mentioned above. If the amount is lower than the above-mentioned range, reinforcing effect is lowered, while the amount is larger than the abovementioned range, there arise poor impregnation of the molding material, deformation of coils and damage of enamel coating, which results in lowering in reliability of motors.

The molding material may further contain one or more additives other than the components mentioned above such as conventional organic peroxide catalysts for unsaturated polyester resins, mold release agents, coupling agents, pigments, coloring agents, and the like.

Examples of organic peroxide catalysts for unsaturated polyester resins are para-chlorobenzoyl peroxide, methyl ethyl ketone peroxide, cyclohexanone peroxide, bis(1-hydroxycyclohexyl peroxide), hydroxyheptyl peroxide, cumene hydroperoxide, dicumyl peroxide, 2,5-dimethyl-2,5-di(tertiary-butyl peroxy)hexane, 1,1-bis(-tertiary-butyl peroxy)-3,3,5-trimethylcylohexane, tertiary-butyl perbenzoate, and the like. These catalysts can be used alone or as a mixture thereof in an amount of 0.1 to 3% by weight based on the weight of the resin component (a).

Examples of the mold release agents are stearic acid, zinc stearate, calcium stearate, Hoechst wax, carnauba wax, etc.

Examples of coupling agents are vinylsilane, epoxysilane, aminosilane, etc.

Examples of pigments are titanium white, chromium oxide, ultramarine blue, red oxide, carbon black, and the like. These pigments and other coloring agents can be used in an amount of 0.1 to 2% by weight based on the weight of the molding material.

In addition, the molding material may further contain one or more thixotropic agents in order to increase the viscosity of the molding material. A part of the filler may be replaced by woodmeal, rice hull powder, waste wood powder treated with a resin, cellolose powder, etc. having a particle size of 44$\mu$ or less.

The components mentioned above can be mixed in a kneader by using a wet kneading process, for example, by mixing the filler and the resin component first for a prescribed time followed by mixing with the fibrous material and other additives, if required, for a prescribed time to give the molding material.

Stators as shown in FIG. 1 can preferably be molded by transfer or injection molding using a turntable or movable table taking productivity into consideration. In such a case, if the viscosity of the molding material is too high, there often take place poor impregnation of the molding material, lowering of insulating properties of coils, etc., while if the viscosity is too low, there often takes place separation of each component, which results in producing cavity, voids, burrs and fins in molded articles and in generating cracks. Therefore, it is preferable to control the lowest melting viscosity in the range of 0.5 to 100 poises. The term "the lowest melting viscosity" means the lowest viscosity of the molding material in the course of heating the molding material, a viscosity of which is lowered first with an increase of the temperature until curing due to the decomposition of a catalyst takes place to increase the viscosity.

Figure 2A:
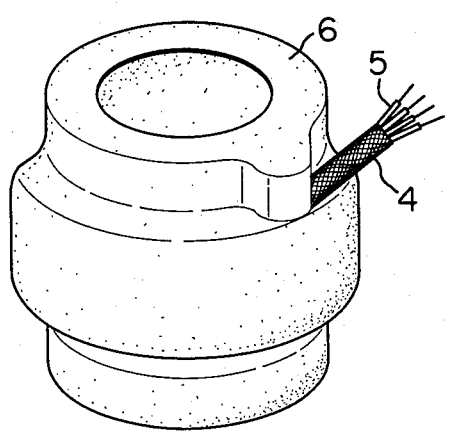
FIG. 2 (a) is a schematic perspective view of a resin molded stator wherein the outer circumference of a stator core is molded into one piece.
Figure 2B:
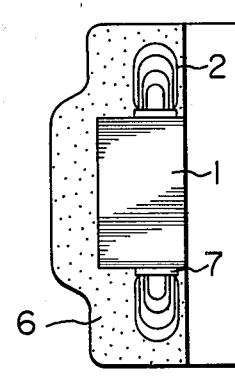
Figure 3A:
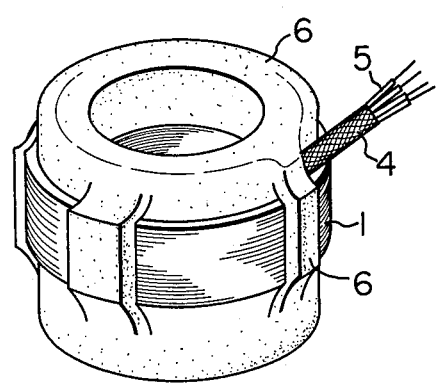
FIG. 3 (a) is a schematic perspective view of a resin molded stator wherein the outer circumference of a stator core is partially exposed when molded into one piece.
Figure 3B:
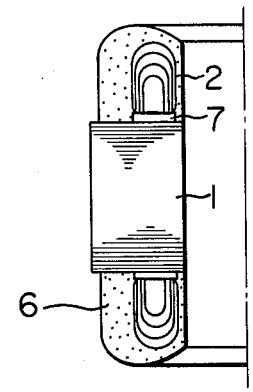

When a stator is molded by using the molding material, the outer circumference of a stator core can be covered completely by the cured molding material as shown in FIG. 2 (a), but in order to increase moisture resistance of the molded article, the outer circumference of the stator core can partially be exposed as shown in FIG. 3 (a).

In the drawings, numeral 1 denotes the stator core, numeral 2 denotes stator windings, numeral 3 denotes slot portion, numeral 4 denotes a protective tube, numeral 5 denotes lead wire, numeral 6 denotes the molding material, numeral 7 denotes slot insulating paper, numeral 8 denotes coil end portion, and numeral 9 denotes fixing string for the lead wire. In the case of FIG. 2, the coil end portion 8 of the stator, the slot portion 3, the fixing string for the lead wire 9 and the outer circumference of the stator core 1 are molded into one piece, whereas in the case of FIG. 3, the outer circumference of the stator core 1 is partially exposed and molded.

It is a very interesting thing that moisture resistance of motors changes greatly depending on whether the outer circumference of stator cores is completely molded or partially exposed. This is because even if a stator is molded by using the molding material, moisture penetrates into around the molded coils when the resin molded stator is exposed to high temperatures and high humidity and thus insulating resistance among coils is lowered. In such a case, if the outer circumference of the stator core is completely covered by the cured molded material, the moisture penetrated around the coils is hardly released. If an electric current flows through the coils under such conditions, since the moisture is not released even if the temperature of the coils is raised, the coils are heated under high humidity, which results in often bringing about insulation breakdown between coils. On the contrary, if the outer circumference of the stator core is partially exposed, since the moisture penetrated around the coils can easily be released comparing with the case of completely covered as mentioned above although the penetration of the moisture around the coils may easily take place, the moisture penetrated may easily be released by the temperature rise of the coils when an electric current is passed through the coils and recovery of insulating resistance between coils is rapid, which results in bringing about no insulation breakdown. Therefore, in order to impart high moisture resistance to resin molded motors, it is preferable to employ such a molding method as exposing the outer circumference of the stator core partially as shown in FIG. 3 (a).

This invention is illustrated by way of the following Examples, in which all parts and percents are by weight unless otherwise specified.

EXAMPLE 1

Effect of Agents for Imparting Low Shrinkage

The following four resin components were prepared.

Run No. 1

A composition containing 70% of a vinyl ester series unsaturated polyester obtained by reacting a bisphenol A type epoxy resin with methacrylic acid (XD-3586 manufactured by Dow Chemical Co., a viscosity at 25° C. being 60 poises) and 30% of styrene. (Comparison)

Run No. 2

A mixture prepared by mixing a phthalic anhydride series unsaturated polyester obtained by using phthalic anhydride as the saturated dicarboxylic acid (PS-617 manufactured by Hitachi Chemical Co., Ltd., styrene content 30%, a viscosity at 25° C. being 10 poises), the styrene content being adjusted to 40%, with an isophthalic acid series saturated polyester obtained by reacting 1.00 mole of isophthalic acid as the saturated dicarboxylic acid, 0.66 mole of ethylene glycol and 0.33 mole of neopentyl glycol as the glycol (average molecular weight, about 300; acid number, 3 or less) as the agent for imparting low shrinkage in weight ratio of 80/20.

Run No. 3

A mixture prepared by mixing an isophthalic acid series unsaturated polyester obtained by using isophthalic acid as the saturated dicarboxylic acid (PS-680 manufactured by Hitachi Chemical Co., Ltd., styrene content 36%, a viscosity at 25° C. being 28 poises), the styrene content being adjusted to 45%, with an isophthalic acid series saturated polyester obtained by reacting 1.00 mole of isophthalic acid as the saturated dicarboxylic acid, 0.66 mole of ethylene glycol and 0.33 mole of neopentyl glycol as the glycol as the agent for imparting low shrinkage in weight ratio of 80/20.

Run No. 4

A mixture prepared by mixing a terephthalic acid series unsaturated polyester obtained by reacting 0.45 mole of terephthalic acid as the saturated dicarboxylic acid, 0.55 mole of maleic acid as the unsaturated dicarboxylic acid, 0.45 mole of ethylene glycol and 0.55 mole of propylene glycol as the glycol containing 45% of styrene (a viscosity at 25° C. being 5 poises) with an isophthalic acid series saturated polyester obtained by reacting 1.00 mole of isophthalic acid as the saturated dicarboxylic acid, 0.66 mole of ethylene glycol and 0.33 mole of neopentyl glycol as the glycol as the agent for imparting low shrinkage in weight ratio of 80/20.

To each 100 parts of the resin component mentioned above, 1 part of dicumyl peroxide as a curing catalyst, 100 parts of heavy calcium carbonate having an average particle size of 2.2μ, 150 parts of aluminum hydroxide having an average particle size of 17μ, 50 parts of short glass fibers having a length of 3.00 mm, 1 part of γ-methacryloxypropyl trimethoxysilane as a coupling agent and 3 parts of zinc stearate as a mold release agent were added and kneaded in a kneader to give a molding material.

Individual molding materials were molded into samples to measure molding shrinkage, physical properties of the cured articles, or crack resistance when a metal insert of 70 mm in inner diameter, 120 mm in outer diameter and 40 mm in thickness was molded together with the molding materials. Transfer molding conditions were as follows: mold temperature 150°±3° C., molding time 5 minutes, and molding pressure 30 kg/cm² (true pressure).

Test methods were as follows:
Molding shrinkage—JIS-K-69111
Flexural strength—ASTM-D-790-66
Izod impact strength—ASTM-D-256 (noched)
Linear expansion coefficient—ASTM-C-696-44
Heating and cooling test—

A metal inserted molded sample was subjected to the following heating and cooling cycles and a temperature at which cracks were generated was recorded: $+130°$ C./2 hours $\rightleftarrows -10°$ C./2 hours (2 cycles)

→ $+130°$ C./2 hours $\rightleftarrows -20°$ C./2 hours (2 cycles)
→ ... (repeating in the same manner as mentioned above with decreasing $-10°$ C. after 2 cycles) ..

→ $+130°$ C./2 hours $\rightleftarrows -70°$ C./2 hours (2 cycles)

The results are as shown in Table 1.

TABLE 1

| Run No. | 1 | 2 | 3 | 4 |
|---|---|---|---|---|
| Molding shrinkage (%) | 1.5 | 0.4 | 0.6 | 0.3 |
| Flexural strength (kg/cm²) | | | | |
| Room temp. | 686 | 652 | 675 | 703 |
| 130° C. | 185 | 95 | 320 | 355 |
| Izod impact strength (kg.cm/cm²) | 5.5 | 4.8 | 5.2 | 5.3 |
| Linear expansion coeff. ($10^{-5}/°$ C.) | 2.4 | 2.5 | 2.4 | 2.3 |
| Crack resistance | | | | |
| Immediately after molding | x | ○ | ○ | ○ |
| Heating and cooling test | — | $-10°$ C. | $-30°$ C. | $-70°$ C. pass |

(Note)
x Cracks were generated.
○ ... No Crack.

As is clear from Table 1, Run No. 1 wherein the vinyl ester series unsaturated polyester was used is poor in crack resistance, and Run No. 2 wherein the phthalic anhydride series unsaturated polyester was used is good in crack resistance immediately after molding but poor in mechanical strength at high temperatures and slightly inferior in crack resistance in heating and cooling test, while Run Nos. 3 and 4 are good both in mechanical strength and crack resistance, particularly Run No. 4 is excellent in crack resistance.

EXAMPLE 2

Effect of Compatibility

The terephthalic acid series unsaturated polyester as used in Example 1, Run No. 4 containing 45% of styrene was mixed with a thermoplastic resin as an agent for imparting low shrinkage in an amount as listed in Table 2 and compatibility thereof was compared. The results are as shown in Table 2.

TABLE 2

| | | | Compatibility | | | | |
|---|---|---|---|---|---|---|---|
| | Thermoplastic resin | | Allowed to stand at room temp. | | | Heating | Cured at 140° C. by mixing 1 |
| Run No. | Kind | Amount (%) | After 1 hr. | After 24 hrs. | After 7 days | 120° C., 1 hr. | phr of DCPO |
| 5 | None | 0 | — | — | — | — | Transparent |

TABLE 2-continued

| | Thermoplastic resin | | Compatibility | | | | |
| | | | Allowed to stand at room temp. | | | Heating 120° C., 1 hr. | Cured at 140° C. by mixing 1 phr of DCPO |
| Run No. | Kind | Amount (%) | After 1 hr. | After 24 hrs. | After 7 days | | |
| --- | --- | --- | --- | --- | --- | --- | --- |
| 6 | Isophthalic acid series saturated polyester | 10 | Good | Good | Good | Good | Opaque |
| 7 | Isophthalic acid series saturated polyester | 20 | " | " | " | " | " |
| 8 | Isophthalic acid series saturated polyester | 30 | " | " | " | " | " |
| 9 | Terephthalic acid series saturated polyester | 20 | " | " | " | " | " |
| 10 | Poly(methyl methacrylate) | 20 | Separated into two layers | — | — | — | — |
| 11 | Poly(vinyl acetate) | 20 | Separated into two layers | — | — | — | — |
| 12 | Polyvinyl chloride | 20 | Separated into two layers | — | — | — | — |
| 13 | Polystyrene | 20 | Separated into two layers | — | — | — | — |

(Note)
DCPO = Dicumyl peroxide

As is clear from Table 2, compatibility with the terephthalic acid series unsaturated polyester is excellent in the case of the iso- or terephthalic acid series saturated polyesters (Run Nos. 6-9) comparing with other thermoplastic resins wehrein the two were separated into two layres immdediately after mixing (Run Nos. 10-13).

In the next place, molding materials were prepared from Run Nos. 5, 7 and 9-13 in the same manner as described in Example 1. Storage stability was evaluated by measuring various physical properties. The same measuring methods as described in Example 1 were used. For evaluating crack resistance, the heating and cooling test was employed. Comparison was made between the molding material immediately after kneading and the same one allowed to stand at 25° C. for 1 month. The results are as shown in Table 3.

resistance after allowed to stand for one month comparing with immediately after kneading. Therefore, considering various properties and storage stability of the molding materials, it is preferable to use saturated polyesters having good compatibility with the terephthalic acid series unsaturated polyester as the agent for imparting low shrinkage.

EXAMPLE 3

Effect of Fillers

To a mixture containing 100 parts of the same resin component as used in Run No. 4, i.e. one including the terephthalic acid series unsaturated polyester containing 45% of styrene and isophthalic acid series saturated polyester in weight ratio of 80/20, 50 parts of short glass fiber having a length of 3 mm, 1 part of γ-methacryloxypropyl trimethoxysilane and 3 parts of zinc stearate,

TABLE 3

| | Immediately after kneading | | | | After allowed to stand for 1 month at 25° C. | | | |
| Run No. | Molding shrinkage (%) | Flexural strength (kg/cm²) Room temp. | Flexural strength (kg/cm²) 130° C. | Crack resistance (Heating & cooling test) | Molding shrinkage (%) | Flexural strength (kg/cm²) Room temp. | Flexural strength (kg/cm²) 130° C. | Crack resistance (Heating & cooling test) |
| --- | --- | --- | --- | --- | --- | --- | --- | --- |
| 5 | 1.7 | 785 | 450 | Cracks were generated immediately after molding | 1.7 | 778 | 435 | Cracks were generated immediately after molding |
| 7 | 0.3 | 703 | 355 | −70° C. pass | 0.3 | 697 | 350 | −70° C. pass |
| 9 | 0.2 | 724 | 375 | −70° C. pass | 0.3 | 712 | 330 | −70° C. pass |
| 10 | 0.6 | 662 | 320 | −70° C. pass | 0.8 | 641 | 330 | −70° C. pass |
| 11 | 0.3 | 724 | 360 | −70° C. pass | 0.6 | 527 | 276 | −30° C. |
| 12 | 0.5 | 711 | 342 | −60° C. | 0.7 | 496 | 255 | −40° C. |
| 13 | 0.6 | 713 | 337 | −50° C. | 0.6 | 510 | 208 | −30° C. |

As is clear from Table 3, the molding materials of Run Nos. 10-13 wherein poly(methyl methacrylate), poly(vinyl acetate), polyvinyl chloride and polystyrene which have poor compatibility with the terephthalic acid series unsaturated polyester are used as the agent for imparting low shrinkage show considerable variations in molding shrinkage, flexural strength and crack one or more fillers as listed in Table 4 in an amount as listed in Table 4 were added to give a molding material. Various properties were measured in the same manner as described in Example 1. The results are as shown in Table 4. As the filler, calcium carbonate having an average particle size of 2.2μ and/or aluminum hydroxide having an average particle size of 17μ (Run Nos. 16-19) or 1.0μ (Run Nos. 14 and 15) were used.

TABLE 4

| Run No. | | 14 | 15 | 16 | 17 | 18 | 19 |
|---|---|---|---|---|---|---|---|
| Filler | Calcium carbonate (%) | 20 | — | 40 | 20 | 60 | 60 |
| | Aluminum hydroxide (%) | 20 | 40 | 20 | 40 | 20 | 20 |
| Spiral flow (inch) | | 78 | 65 | 42 | 35 | 24 | 17 |
| Lowest melting viscosity (poise) | | 0.6 | 0.3 | 3 | 1 | 34 | 15 |
| Molding shrinkage (%) | | 0.6 | 0.8 | 0.3 | 0.4 | 0.1 | 0.2 |
| Flexural strength | | | | | | | |
| Room temperature (kg/cm$^2$) | | 614 | 583 | 685 | 703 | 652 | 635 |
| 130° C. (kg/cm$^2$) | | 220 | 206 | 349 | 355 | 225 | 237 |
| Linear expansion coeff. (10$^{-5}$/°C.) | | 2.9 | 2.6 | 2.2 | 2.3 | 1.9 | 1.9 |
| Crack resistance | | | | | | | |
| Immediately after molding | | | | | | | |
| Heating and cooling test | | −30° C. | −20° C. | −70° C. pass | −70° C. pass | −70° C. pass | −70° C. pass |

(Note)
: No crack

As is clear from Table 4, when the proportion of the filler is too small (Run Nos. 14 and 15), molding shrinkage becomes large, which results in lowering in crack resistance. On the other hand, when the proportion of the filler becomes large, there is a tendency to enlarge the lowest melting viscosity of the molding materials and to make fluidity smaller. Molding shrinkage of molding materials can be lowered by increasing a mixing amount of the agent for imparting low shrinkage, but this is not desirable because of lowering in physical properties of cured articles at high temperatures.

EXAMPLE 4

Effect of Addition of Aluminum Hydroxide

Molding materials were prepared by mixing 100 parts of the same resin component as used in Run No. 4, i.e., one including the terephthalic acid series unsaturated polyester containing 45% of styrene and isophthalic acid series saturated polyester in weight ratio of 80/20, 1 part of dicumyl peroxide, 250 parts of fillers (a mixture of aluminum hydroxide and calcium carbonate being used and the total amounts of the fillers being maintained constant at 61.7% while changing the amount of aluminum hydroxide as shown in Table 5), 50 parts of short glass fiber having a length of 3 mm, 1 part of γ-methacryloxypropyl trimethoxysilane and 3 parts of zinc stearate. Using the molding materials, resin molded stators were produced so that stator cores were completely covered by the molding materials as shown in FIG. 2(a). Each resin molded stator was housed in a 80 W single-phase motor, which was started and locked at 120 V (50 Hz) to examine whether combustion took place until disconnection of the coils. The results are as shown in Table 5. In Table 5, the time in Run Nos. 20 and 21 means that beginning combustion. In Run Nos. 20 and 21, since a large amount of electric current was passed, the power supply was cut automatically at the time of the beginning of combustion. In other cases, the coils were disconnected to cut an electric current.

TABLE 5

| Run No. | 20 | 21 | 22 | 23 | 24 |
|---|---|---|---|---|---|
| Amount of aluminum hydroxide (%) | 0 | 10 | 15 | 20 | 40 |
| Time required for disconnection of coils or combustion (min.) | 28 | 27 | 23 | 24 | 22 |
| Production of combustion or instant combustion | Yes | Yes | No | No | No |
| Inflammability of gas generated by decomposition | Yes | Yes | Yes | No | No |

As is clear from Table 5, when the molding material contains 20% or more of aluminum hydroxide based on the total weight of the molding material, combustion of motors when locked can completely be inhibited.

EXAMPLE 5

Effect of Particle Size of Fillers

Molding materials were prepared by using fillers having different particle sizes as shown in Table 6 in the same manner as described in Example 4 except for making the proportion of the fillers 60% based on the weight of the molding material. Using these molding materials, stators for 80 W single-phase motors were molded as shown in FIG. 3 (a). Impulse BDV (breakdown voltage) between molded coils was measured and listed in Table 6 together with other properties. Impulse BDV of the coil before molding was 10–12 kV.

TABLE 6

| Run No. | 25 | 26 | 27 | 28 | 29 | 30 | 31 |
|---|---|---|---|---|---|---|---|
| Filler content (%) | | | | | | | |
| Aluminum hydroxide (Average particle size 1.0μ) | 20 | 20 | 20 | 20 | 20 | — | 20 |
| Aluminum hydroxide (Average particle size 60μ) | — | 20 | — | — | — | — | — |
| Calcium carbonate (Average particle size 2.2μ) | 40 | 20 | 20 | 20 | 20 | 30 | — |
| Limestone powder (Average particle size 125μ) | — | — | 20 | — | — | — | — |
| Silica sand (Average particle size 800μ) | — | — | — | 20 | — | 30 | — |
| Silica sand (Average particle size 125μ) | — | — | — | — | 20 | — | — |
| Silica sand (Average particle size 3.5μ) | — | — | — | — | — | — | 40 |

TABLE 6-continued

| Run No. | 25 | 26 | 27 | 28 | 29 | 30 | 31 |
|---|---|---|---|---|---|---|---|
| Spiral flow (inch) | 35 | 45 | 50 | 65 | 47 | 65 | 55 |
| Lowest melting viscosity (poises) | 6.5 | 3.2 | 2.7 | 1.0 | 3.5 | 0.8 | 2.5 |
| Impulse BDV of molded coil (kV) | 12 | 7.5 | 4.5 | 2.2 | 5.5 | 2.5 | 12 |
| Crack resistance of molded stator (heat and cooling test) | −70° C. pass | −70° C. pass | −70° C. pass | −70° C. pass | −70° C. pass | −70° C. pass | −70° C. pass |

As is clear from Table 6, the molding materials containing as fillers silica sand, limestone powder or aluminum hydroxide having a larger particle size (Run Nos. 26–30) show relatively low lowest melting viscosity and larger spiral flow, which makes fluidity good, but impulse BDV between molded coils is considerably low. On the other hand, the molding materials containing as fillers those having a small particle size (Run Nos. 25 and 31) show relatively higher impulse BDV between molded coils than those of before molding, which shows that the resin molded stators using the special molding materials of this invention are good in breakdown voltage of stator windings.

The present inventors observed states of cross-sections of slots of resin molded stators produced by using the molding material of Run No. 30 containing fillers having a large particle size and that of Run No. 4 used in Example 1 containing fillers having a small particle size by using microphotographs and found that in the former case, coils are pushed to one direction in each slot, whereas in the latter case, coils are distributed uniformly in each slot. Thus, when a molding material containing a filler having a large particle size, e.g. larger than 44μ, is used for molding a stator, the thickness of enamel coating of coils in a slot changes greatly, which seems to lower BDV between molded coils.

EXAMPLE 6

Effect of Length and Amount of Fibrous Material

Molding materials were prepared by mixing 100 parts of the same resin component as used in Run No. 4, i.e., one including the terephthalic acid series unsaturated polyester containing 45% of styrene and isophthalic acid series saturated polyester in weight ratio of 80/20, 1 part of dicumyl peroxide, 150 parts of aluminum hydroxide, 100 parts of calcium carbonate, 3 parts of zinc stearate and a fibrous material as listed in Table 7 in an amount as listed in Table 7 (percent based on the total weight of the molding material). Physical properties of these molding materials and cured articles obtained therefrom were measured in the same manner as described in Example 1. The results are as shown in Table 7.

TABLE 7

| Run No. | 32 | 33 | 34 | 35 | 36 | 37 | 38 | 39 | 40 | 41 |
|---|---|---|---|---|---|---|---|---|---|---|
| Filler content (%) | | | | | | | | | | |
| Glass fiber (length 0.5 mm) | 3 | — | — | — | — | — | — | — | — | — |
| | — | 7 | — | — | — | — | — | — | — | — |
| | — | — | 15 | — | — | — | — | — | — | — |
| Glass fiber (length 3.0 mm) | — | — | — | 3 | — | — | — | — | — | — |
| | — | — | — | — | 7 | — | — | — | — | — |
| | — | — | — | — | — | 15 | — | — | — | — |
| Glass fiber (length 6.0 mm) | — | — | — | — | — | — | 3 | — | — | — |
| | — | — | — | — | — | — | — | 7 | — | — |
| | — | — | — | — | — | — | — | — | 15 | — |
| Polyvinyl alcohol fiber (length 3.0 mm) | — | — | — | — | — | — | — | — | — | 3 |
| Spiral flow (inch) | 65 | 55 | 50 | 55 | 40 | 32 | 42 | 30 | 24 | 42 |
| Lowest melting viscosity (poise) | 1.5 | 3.8 | 10.6 | 4.3 | 8.5 | 12.0 | 10.5 | 20 | 35 | 7.5 |
| Molding shrinkage (%) | 0.8 | 0.6 | 0.5 | 0.5 | 0.3 | 0.2 | 0.4 | 0.3 | 0.1 | 0.4 |
| Izod impact strength (kg.cm/cm$^2$) | 2.6 | 2.7 | 2.9 | 3.8 | 5.2 | 6.5 | 4.7 | 5.8 | 7.2 | 5.6 |
| Flexural strength (kg/cm$^2$) | | | | | | | | | | |
| Room temperature | 325 | 360 | 450 | 525 | 628 | 773 | 582 | 685 | 755 | 478 |
| 130° C. | 148 | 165 | 230 | 295 | 343 | 370 | 335 | 380 | 425 | 195 |
| Impulse BDV of molded coils (kV) | 12 | 13 | 11 | 12 | 11 | 10 | 10 | 8.5 | 5.5 | 12 |
| Crack resistance of molded stator (heating and cooling test) (°C.) | 0 | −10 | −30 | −30 | −50 | −70 pass | −40 | −70 pass | −70 pass | −50 |

As is clear from Table 7, when the length of glass fiber becomes shorter, sufficient mechanical strength and crack resistance due to reinforcing effect can be obtained in the case of adding a sufficient amount of glass fiber to molding materials. On the other hand, when the length of glass fiber is too long such as 6.0 mm, there is a tendency to lower impulse BDV together with undesirable variation of thickness of enamel coating of coils in slots.

EXAMPLE 7

Stators for 80 W single-phase motors were molded by using the molding materials Run No. 4 used in Example 1 and Run No. 30 used in Example 5. In each case, a resin molded stator wherein the outer circumference of a stator core was molded into one piece as shown in FIG. 2 (a) (A) and a resin molded stator wherein the outer circumference of a stator core was partially exposed as shown in FIG. 3 (a) (B) were produced and housed in motors. Molding conditions using a transfer press were as follows: mold temperature 150° C., transfer pressure 30 kg/cm$^2$, charging time of the material 15 sec., and molding time 3 min. Moisture resistance life of the resulting motors were tested under high humidity or under water spray. The moistening test was conducted by driving a motor under no load for 12 hours at 60° C. under supersaturated vapor and stopping the motor for 12 hours and repeating this cycle. The water spray test was conducted by spraying 10 l of water in 5 minutes once a day (at a rate of 2 l/minute) over a motor which was driven under no load. The results are as shown in Table 8.

TABLE 8

| Run No. | 4 | | 30 | |
|---|---|---|---|---|
| Form of resin molded stator | A | B | A | B |
| Impulse BDV between molded coils (kV) | 12 | 10 | 2.6 | 2.5 |
| Moisture resistance of motor | | | | |
| Moistening test | The motor was driven in good order over 75 days | The motor was driven in good order over 75 days | Short-circuit between layers occurred after 13 days | Short-circuit between layers occurred after 15 days |
| Water spray test | The motor was driven in good order over 75 days | The motor was driven in good order over 75 days | Short-circuit between layers occurred after 5 days | Short-circuit between layers occurred after 7 days |

As is clear from Table 8, the motor using the resin molded stator of this invention (Run No. 4) is excellent in moisture resistance without generating short-circuit between layers of coils after a long period of moisture resistance test. There is a tendency to show better results when the outer circumference of stator core is partially exposed when molded.

As mentioned above, the resin molded stator of this invention is clearly excellent in crack resistance, breakdown voltage of molded coils and reliability of molded coils under high humidity.

What is claimed is:

1. A resin molded stator comprising a stator core and coils as major constituents at least parts of which are molded into one piece by a molding material, said molding material comprising
   (a) a low-shrink unsaturated polyester resin,
   (b) a filler material consisting of particulate filler having a particle size of 44μ or less, and
   (c) a fibrous material consisting of fibers having a length of 3 mm or less,
      in proportions of 15 to 40% by weight of the component (a) and 60 to 85% by weight of a total of the components (b) and (c), and a weight ratio of the component (b) to the component (c) being 3 to 30/1; all of any filler material contained in the molding material consisting of component (b).

2. A resin molded stator according to claim 1, wherein the molding material has molding shrinkage of 0.5% or less at the time of molding.

3. A resin molded stator according to claim 1, wherein the low-shrink unsaturated polyester resin comprises
   (i) a terephthalic acid series unsaturated polyester,
   (ii) styrene, and
   (iii) a saturated polyester,
in which the proportion of a total of (i) and (ii) is 90 to 70% by weight and the proportion of (iii) is 10 to 30% by weight and a weight ratio of (i) to (ii) is 80/20 to 40/60.

4. A resin molded stator according to claim 3, wherein the saturated polyester is an isophthalic acid series saturated polyester.

5. A resin molded stator according to claim 1, wherein the molding material contains 20% by weight or more of aluminum hydroxide as said filler material based on the total weight of the molding material.

6. A resin molded stator according to claim 1, wherein the fibrous material is glass fiber.

7. A resin molded stator according to claim 1, 2 or 3, wherein coil end portions, slot portions, terminal portions in addition to a stator core and coils of a stator assembly are molded into one piece by using the molding material.

8. A resin molded stator according to claim 1, 2 or 3, wherein the outer circumference of a stator core is partially exposed when a stator assembly is molded into one piece.

9. A resin molded stator according to claim 1, wherein the molding material contains fibrous material consisting of fibers having a length of from 0.5 to 3 mm.

10. A resin molded stator according to claim 1, wherein the particulate filler contained within said molding material consists of inorganic mineral filler or an admixture of inorganic mineral filler and organic non-fibrous filler.

11. A resin molded stator according to claim 10, wherein said inorganic mineral filler is selected from the group consisting of calcium carbonate, magnesium carbonate, barium sulfate, calcium sulfate, alumina, clay, kaoline, talc, diatomaceous earth, mica powder, glass fiber powder, aluminum hydroxide, magnesium hydroxide, hydrated gypsum, zinc borate, borax, silica sand, and mixtures thereof and said organic non-fibrous filler is selected from the group consisting of wood meal, rice hull powder, waste wood powder treated with a resin and cellulose powder.

12. A resin molded stator according to claim 11, wherein said fibrous material contained within said molding material is selected from the group consisting of glass fibers, carbon fibers, polyvinyl alcohol fibers, nylon fibers, cellulose fibers and mixtures thereof.

* * * * *